(12) United States Patent
Bordignon

(10) Patent No.: US 8,100,387 B2
(45) Date of Patent: Jan. 24, 2012

(54) COMBINATION OIL/GAS-OPERATED SPRING WITH EXPANSION VESSEL

(76) Inventor: Silvano Bordignon, Rosa' (IT)

( * ) Notice: Subject to any disclaimer, the term of this patent is extended or adjusted under 35 U.S.C. 154(b) by 545 days.

(21) Appl. No.: 11/659,947

(22) PCT Filed: Aug. 1, 2006

(86) PCT No.: PCT/EP2006/064899
§ 371 (c)(1),
(2), (4) Date: May 28, 2009

(87) PCT Pub. No.: WO2007/028680
PCT Pub. Date: Mar. 15, 2007

(65) Prior Publication Data
US 2009/0283943 A1 Nov. 19, 2009

(30) Foreign Application Priority Data
Sep. 6, 2005 (IT) .............................. PN2005A0061

(51) Int. Cl.
*F16F 9/02* (2006.01)
(52) U.S. Cl. ........................................ 267/119; 267/130
(58) Field of Classification Search ................. 72/19.9, 72/350, 386, 453.13; 267/118, 119, 130
See application file for complete search history.

(56) References Cited

U.S. PATENT DOCUMENTS

| | | | |
|---|---|---|---|
| 3,085,530 A | | 4/1963 | Williamson |
| 5,467,705 A | * | 11/1995 | Daniel et al. .................. 100/214 |
| 5,966,981 A | | 10/1999 | Janos et al. |
| 7,197,910 B2 | * | 4/2007 | Kodani ...................... 72/453.13 |

FOREIGN PATENT DOCUMENTS

EP 1 500 843 1/2005
* cited by examiner

*Primary Examiner* — Christopher Schwartz
(74) *Attorney, Agent, or Firm* — Wenderoth, Lind & Ponack, L.L.P.

(57) ABSTRACT

A combination oil/gas spring includes a first hollow casing, a piston capable of fluid-tightly sliding within the casing, a rod connected rigidly with an end portion thereof to a central portion of the piston, a first chamber containing an actuating rod provided inside the casing, a second sealed chamber provided within the same casing on the opposite side of the piston, a mass of hydraulic fluid filling the second sealed chamber, a second hollow casing and a respective second piston provided to slide therewithin, a first conduit connecting the interior of the second sealed chamber with the interior of the second hollow casing, a first valve connected to the first conduit and adapted to selectively open and close it, a second conduit being provided to connect an expansion vessel to the first conduit at a position upstream of the first valve, and a second valve being provided on the second conduit. The combination oil/gas spring also includes a pressure-exerting unit adapted to act by exerting a controllable pressure upon the surface of the liquid in the expansion vessel.

23 Claims, 6 Drawing Sheets

COMBINATION OIL/GAS-OPERATED SPRING WITH EXPANSION VESSEL

The present invention refers to a combination oil/gas-operated spring, or gas/hydraulic-fluid spring, as this kind of springs are more generally referred to in the art, particularly designed for use in metal forming presses or, anyway, suitable for separating surfaces that are actuated at high contact pressures, and provided with particular features that are effective in improving the performance thereof as compared with existing combination oil/gas springs.

The state of art concerning a combination oil/gas spring provided with at least a piston, which is adapted to act as a dampening member under abrupt loads being imposed thereupon, and capable of recovering into its initial working position in a substantially smooth, controlled manner, is generally known, e.g. from the EP publication No. 1 500 843 A1, as well as the patents cited therein, so that any further description thereof shall therefore be omitted here for reasons of brevity.

In particular, in view of ensuring a better understanding of the actual scope of the present invention, it appears adequate at this point to make it clear that, when a return stroke of the piston is defined as a "controlled" or "smooth" one, this is intended to mean that both the moment at which the return stroke of the piston begins at the end of the impact or compressive stress, and the speed at which said return stroke takes place are not free and dependent on the sole elastic reaction of the elastic means used, but are somehow controlled both as far as said initial moment and said return stroke rate are concerned.

The present invention applies to combination oil/gas springs that are "delayed", i.e. those springs in which the instant at which the return stroke begins is controllable through an external control independently of the position of the piston and the related actuating rod; moreover, the present invention applies to such "delayed" combination oil/gas springs, which may or may not be of the "slowed-down" return-stroke type, i.e. of the type regaining the initial position without any violent return movement and any braking effect after the beginning of the return stroke, wherein the reasons why the need is sometimes felt for oil/gas springs to be provided that are not only delayed, but also slowed down, are again set forth in the afore-mentioned EP publication No. 1 500 843 A1.

The solutions disclosed in the above-mentioned patent publication have turned out as being fully adequate and effective in solving the described problems at the roots of the need for the return stroke to be suitably controlled.

However, as a result of continuous improvements having been made in the art, and uses and applications having become increasingly sophisticated and demanding, a problem has eventually come out, which is neither considered nor tackled by any of the solutions proposed hitherto, actually.

With reference to FIG. 1A of the afore-cited EP publication No. 1 500 843 A1, which may be considered as representative of the state of the art, it can in fact be noticed that the operating steps of the spring being disclosed therein follow the known sequence, i.e.:

1) downstroke, i.e. downward movement of the rod 112 and the piston 102;
2) closing of the valve 109 on the circuit 107A;
3) upward movement or raising of the load or pressing die 130;
4) the rod 112, with the piston 102, remains in theory in the previous position;
5) re-opening of the valve 109;
6) concurrent upstroke, or upward movement, of the piston and the rod 112.

The above-mentioned problem derives practically from the fact that the hydraulic medium that fills up the first chamber 103 and the second chamber 105—both of them being variable-volume chambers—is not incompressible, after all, as this used to be considered in a relatively oversimplified manner in classic physics; quite on the contrary, as this could have been measured and found experimentally, if such medium is subject to an adequate pressure, it can be compressed elastically—following laws of its own—and the reaction of this compressed hydraulic medium is an elastic reaction of a classic kind, in the sense that, if the pressure which it is subject to is removed, it promptly recovers to the original volume, i.e. the volume it had before the application, and therefore the action, of such pressure.

This particular behaviour tends to affect the afore-described operating mode to a significant extent; namely, the step 4) is altered in the sense that the hydraulic medium contained under high-pressure conditions in the first chamber 103, under the piston and the section of conduit 107 comprised between said chamber 103 and said valve 109, is no longer subject to any pressure when the load 130 is raised. As a result, it tends to recover to the volume it normally has under relaxed conditions, i.e. it tends to—albeit slightly—increase its volume.

Since it is physically prevented from expanding beyond said valve 109, owing to the latter being closed, such expansion translates into an increase of volume within said chamber 103, thereby unavoidably causing the piston 102, which delimits said chamber on a side thereof, to slightly displace, i.e. generally raise.

Such raising of the piston, therefore, occurs at the same time as the lifting of the load 130, and this practically means that the upper front end of the rod 112 "tracks", i.e. follows for a very short distance—but with a certainly non-negligible pressure, which is initially equal to the maximum pressure generated by the piston in the hydraulic medium—the lower side of the load or pressing die 130.

This ultimately means that the desired immediate separation of the rod from the pressing die does by no means occur right upon the end of the compression phase and, in particular, during the upstroke of the press tool 130, since for a certain distance—albeit a very short one—the rod 112 keeps "sticking" to said press tool 130.

Such circumstance brings about a number of functional drawbacks, which most particularly tend to affect the quality of the pressed parts, and which are largely known to all those skilled in the art, so that no need is seen here to dwell upon them any further.

It would therefore be desirable, and it is actually a main purpose of the present invention, to provide a solution for the implementation of combination oil/gas springs, in particular such springs intended for use in heavy-duty metal forming equipment, in which such springs comprise:

a working piston and a cylinder adapted to slidably hold said working piston, both of which capable of withstanding that may be also particularly strong, and means adapted to ensure that—upon the end of the compression phase and the subsequent lifting, and release, of the compression load, and prior to the return stroke of the spring being initiated and started through a control of the delayed/slowed-down operation of the gas-operated portion of the spring—the piston/rod assembly is capable of remaining in the farthest position reached at the end of the compression phase by overcoming the decompression effect of the inherently non-incompressible hydraulic medium, i.e. that said rod does not "track", i.e. follow—not even for a very short initial distance—the upward movement of the compressing press tool.

Such spring shall still have characteristics that ensure easy manufacturability and immediate, reliable use and application—as this is typical of this kind of springs—and shall furthermore ensure that the return stroke of the working piston is selectively and easily controllable as far as both the return stroke speed and the moment at which said return stroke starts are concerned.

These aims, along with other features of the present invention, are reached in a combination oil/gas spring made and operating as recited in the appended claims.

BRIEF DESCRIPTION OF THE DRAWINGS

Features and advantages of the present invention will anyway be more readily and clearly understood from the description that is given below by way of non-limiting example with reference to the accompanying drawings, in which.

DETAILED DESCRIPTION OF THE INVENTION

Figure 1:
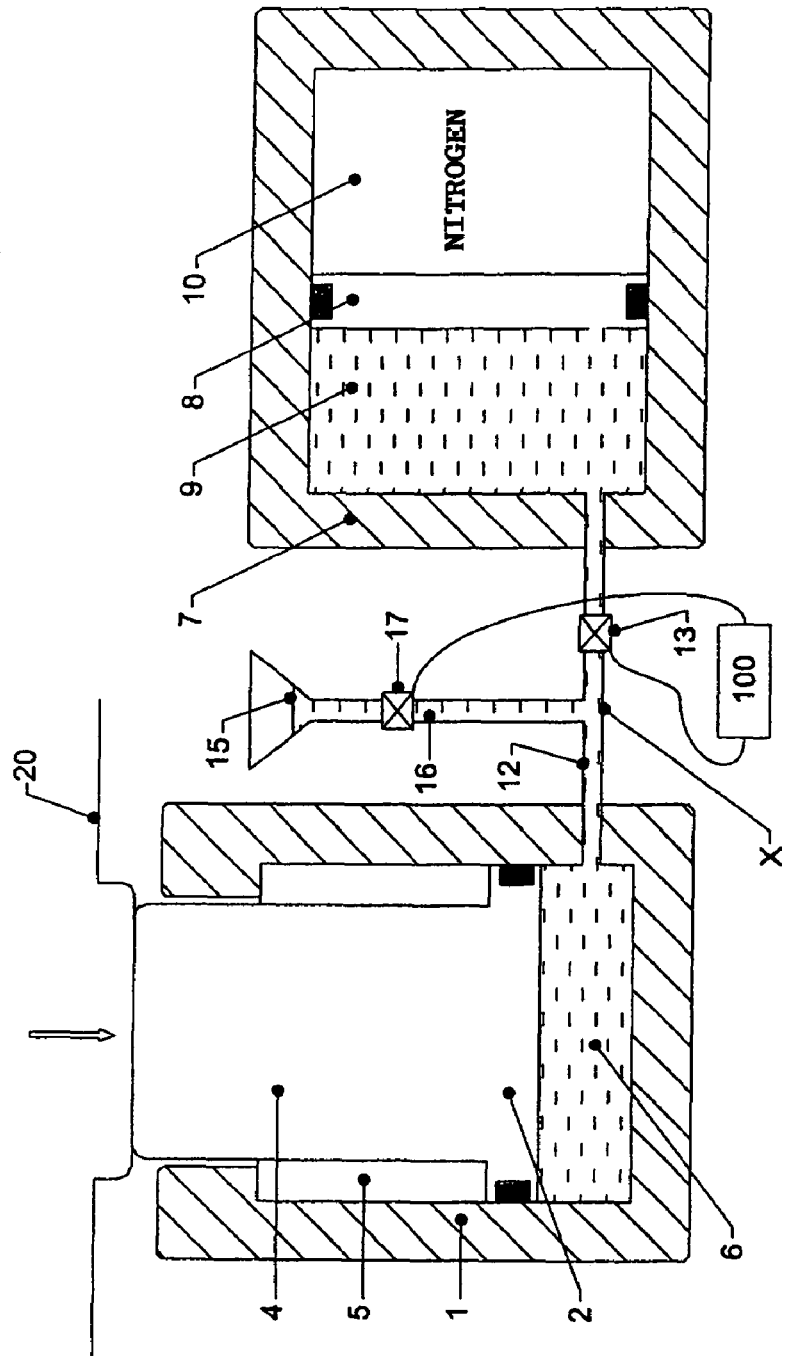
FIG. 1 is a conceptual diagrammatical view of a combination oil/gas spring according to the present invention.

With reference to FIG. 1, a combined oil/gas spring according to the present invention can be noticed to essentially comprise:
a hollow cylindrical casing 1,
a piston 2, housed inside said hollow cylindrical casing 1 and adapted to fluid-tightly slide against and along the inner cylindrical walls of said casing,
a rod 4, which is rigidly applied on a side of said piston and is adapted to be reciprocatingly displaced inwardly and outwardly relative to said cylinder 1, consistently with the motion of said piston,
a first chamber 5 provided inside said cylinder and delimited by said piston and, partially, by the walls of said rod, further to other inner walls of said hollow cylindrical casing 1,
a second sealed chamber 6 provided inside said cylinder and delimited by said piston and other inner walls of said hollow cylinder, and arranged on the opposite side of said first chamber with respect to said piston,
a mass of hydraulic medium that fully fills up said second sealed chamber 6,
a second cylindrical hollow casing 7,
a respective second piston 8 adapted to slide within said second cylindrical hollow casing 7 and fluid-tightly fitting against the walls of the latter, so as to define a third chamber 9 and a fourth chamber 10, that are distinct and separated from each other by said second piston.

There is further provided a first conduit 12 connecting the interior of said second sealed chamber, which is filled with hydraulic medium, with said third chamber 9, which is a variable-volume chamber and is similarly filled with hydraulic medium.

In said first conduit 12 there is provided a valve 13, which is adapted to selectively open and close said conduit, according to any of a number of modes and ways as largely known as such in the art.

According to the present invention, there is provided an expansion vessel 15, whose filled portion contains hydraulic medium and communicates, via a second conduit 16, with said first conduit 12 at a position X lying between said first valve 13 and the section connecting this valve to the inflow point of said conduit 12 into said second chamber 6.

Provided in said second conduit 16 there is a second valve 17, whose function will be explained right below.

The expansion vessel 15 may be of any conventional kind and, therefore, may be comprised of a lower sealed casing that is of course connected to said second conduit 16; this casing contains a small amount of hydraulic medium which, therefore, according to the opening condition of said second valve 17 and the pressure prevailing in said expansion vessel 15 with respect to the one prevailing in said first conduit 12, may be either "pumped" from said vessel 15 into said first conduit 12 or—as the case may be—caused to flow from said first conduit 12 towards and into said vessel 15.

According to the present invention there are also provided appropriate control means 100 (illustrated merely in a symbolical manner in the Figure), which are adapted to actuate said first and second valve means 13 and 17.

The operation of the spring according to the invention is as follows: with reference to FIG. 2, which shows the development pattern of the instant pressures in the successive operating steps of the spring described below, the three graphs—indicated at P6, P9 and Pv—refer to the inner pressure in the second chamber 6, the third chamber 9 and the expansion vessel 15, respectively, during corresponding operating steps.

In a first step A of the operating cycle, which corresponds to the point 1) of the afore-described sequence, the second valve 17 is kept closed and the pressing means 20 presses against the upper stem portion of said rod 4, thereby causing it to move downwards. This in turn triggers a cascade effect that—as an immediate mechanical and hydraulic consequence—causes said first piston 2 to also move downwards, said second chamber 6 to be emptied by urging the medium contained therein to flow into the third chamber 9 via the first conduit 12; this again causes said second piston 8 to displace into the farthest position to the right in the Figure, thereby decreasing the volume of said fourth chamber 10 to a minimum and, therefore, causing the pressure $T_{max}$ of the gas in said chamber and in the casing 7 to increase to a maximum.

Since the valve 13 is open, also the pressure of the mass of hydraulic medium will most obviously increase at the same rate and by a same extent.

In the second step B of the operating cycle, the valve 13 is closed; since the pressures were at an equilibrium, i.e. in a substantially balanced state and there was previously no passage of medium—either gas or hydraulic medium—between the various chambers, such closing of said valve does not cause any variation to take place in the state of the device.

In the third step C of the operating cycle, the second valve 17 in the second conduit 16 is opened; as a result of this valve opening, the hydraulic medium contained in the conduit 12 and the chamber 6—and therefore submitted to the maximum pressure—is allowed to communicate with, i.e. is exposed to a sensibly lower pressure—which may even approach atmospheric pressure—acting onto the surface of the medium contained in said expansion vessel 15.

As a result, said hydraulic medium will "discharge", i.e. release its excess pressure over to said expansion vessel, so that the medium in the chamber 6 and the conduit 12—further to reducing its pressure—increases its volume to a value corresponding to the newly established pressure.

In fact, the greater pressure in the hydraulic medium had previously caused the volume thereof to decrease, albeit to just a small extent, since it is a largely known fact that liquids are compressible in response to pressure, albeit to just a small extent and according to different laws than those applying to gases.

Anyway, such increase in the volume of the liquid, i.e. hydraulic medium, is then offloaded on to the expansion vessel, whose liquid-filled portion therefore is caused to increase its own volume.

However, the most important and desired effect of such process lies in the fact that the pressure of the hydraulic medium in the second chamber 6 gets down to a very low value $T_{min}$.

Now, if the afore-mentioned pressing means 20 is raised by the rod 4 in a subsequent moment, the pressure in the chamber 6—which is already reduced to quite low a value owing to its having been released into the expansion vessel—will no longer be sufficient to cause the piston and, therefore, the rod 4 to raise, not even by just a very slight extent.

The ultimate result of this process—and a basic aim pursued by this invention—is that said rod 4 keeps still and steady in its previously reached farthest position, without any possibility for it to follow the pressing means during the upstroke or raising movement of the latter.

In the subsequent step D of the operating cycle, the expansion vessel 15 is submitted to a controlled pressure increase $T_k$ for a pre-established length of time, after which this pressure increase $T_k$ is nullified. The way in which this pressure increase is brought about may be implemented using any of as number of means and modes that are largely known as such in the art, as this shall on the other hand be better explained further on.

Since the second valve 17 keeps open, said pressure increase will cause the pressure in the conduit 12 and the second chamber 6 to increase, as well, and if this increase occurs to an adequate extent, then the piston 5 and the rod 4 will at a certain point be pushed again into a position away from the maximum compression position thereof. The purpose of this process is to restore the amount of hydraulic fluid previously released into the expansion vessel 15 by causing exactly that amount of hydraulic fluid urged into the expansion vessel during the preceding step C of the process to flow back into the conduit 12 and the second chamber 6.

In the next step E of the operating cycle, the second valve 17 is closed, without this anyway implying any variation in the state of the spring, actually.

In the final step F of the operating cycle, after the pressure in the expansion vessel 15 has been brought down to nil, the first valve 13 is opened; this causes a communication to be established between the second chamber 6 and the third chamber 9, so that—as a result—the high pressure prevailing at that moment in the third chamber 9 is able to pass over—thereby undergoing a slight reduction—into the second chamber 6. This of course is effective in causing the first piston 2 and the related rod 4 to rise again.

The spring is thereby restored into the initial condition thereof, so that it is ready to start a new operating cycle.

As far as the liquid contained in the expansion vessel 15 is concerned, it is subject to move up and down to oscillating, but stabilized levels under continuous operating conditions, since the amount of liquid, i.e. hydraulic medium that is cyclically discharged into the expansion vessel 15, is then regularly let again into the conduit 12 and, from here, into the second chamber 6; the third chamber 9 is not involved in this process, owing to the valve 13 being kept in the closed state thereof during the same.

As described and illustrated above, the present invention further allows for a number of useful different embodiments and improvements.

Figure 3:
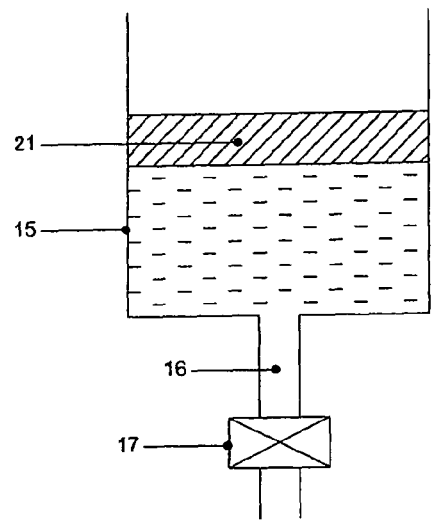
FIGS. 3 to 6 are views of respective modified embodiments of a basic device of the present invention.
Figure 4:
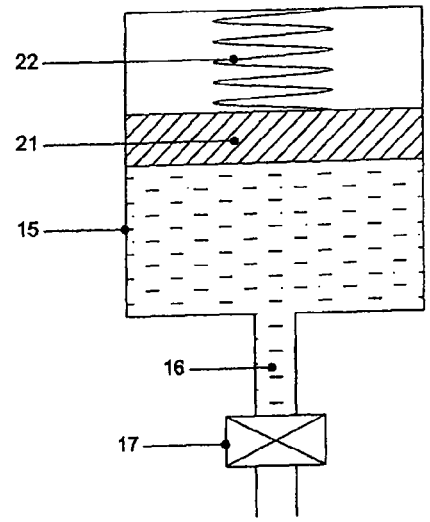

With reference to FIGS. 3 and 4, the pressure acting upon the liquid in the expansion vessel 15 may be brought about by means of a third piston 21, which fluid-tightly seals off the surface of the liquid from the top, but is anyway able to slide up and down relative to the inner walls of the expansion vessel.

Figure 5:
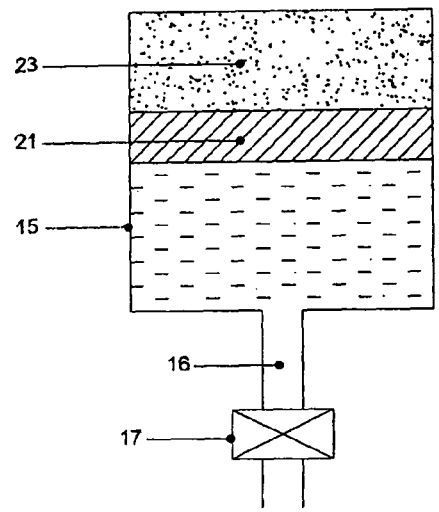

This third piston 21 may be urged to compress the liquid lying therebelow in the expansion vessel 15 by inherently and largely known means, such as for instance a spiral or coil spring 22 acting upon the upper side thereof or—as this is shown symbolically in FIG. 5—by implementing said third piston 21 in the form of the piston of a kind of gas spring, whose—obviously sealed—compression chamber 23 is located on the side of the piston 21 that lies opposite to the one facing the surface of the liquid in the expansion vessel 15.

With both solutions illustrated in FIGS. 4 and 5 the result is ultimately obtained that the pressure acting upon the medium in the expansion vessel is constant, i.e. a fact that implies that, after the valve 13 is closed and the pressing means 20 is raised (step C), such constant pressure is able to immediately act in said second chamber 6, so that the piston 2 and the rod 4 are immediately urged to raise and, therefore, to follow the movement of the pressing means 20; however, the pressure in the expansion vessel may be adjusted to such a sufficiently low value—lying adequately below the pressure prevailing in the third chamber 9—as to prevent problems from being created as far as the overall operation of the gas spring is concerned.

Figure 6:
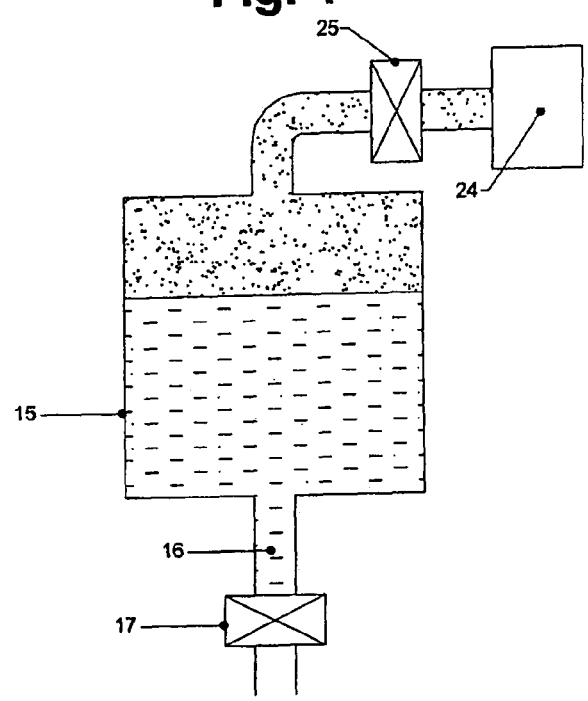

If the preferred option is on the contrary to have a controlled return movement of the piston 2, then the expansion vessel 15 may be connected in a fluid-tight manner, with the upper portion thereof, to a controlled-delivery gas supply source capable of supply gas at a defined pressure, as shown symbolically in FIG. 6, which may be implemented by for instance either connecting a conventional pneumatic or air supply 24 with a controlled valve 25 or connecting said third piston 21 to an appropriate controllable actuator (not shown) adapted to compress said third piston 21 within the expansion vessel 15 so as to compress the liquid contained therein.

The embodiment described above enables a gas spring to be obtained, which is not only free from the drawback represented by the slight, but fully undesired "return" movement of the piston to immediately follow the raising movement of the pressing means or press tool 20, but is also adapted to operate according to a "delayed" return mode, the purport and meaning of which is largely known to all those skilled in the art. In fact, the delay in the return stroke of the piston is strictly and accurately determined by the opening moment of the valve 13, as this can be quite easily controlled and accomplished with means that are largely known as such in the art.

This valve, however, does not provide yet any so-called "slowed-down" operating mode, even this term being largely known to those skilled in the art.

The most commonly used technique in view of overcoming such limitation calls for a restriction or throttle to be inserted in said first conduit 12, which is adapted to obstruct and, therefore, slow down the passage of the hydraulic medium during the return-stroke phase. However, it can be readily appreciated that such throttle would obstruct the passage of the hydraulic medium also during the main spring-compression phase and such circumstance can actually become the cause of the well-known, serious drawback deriving from not only the particular portion of the spring involved, but also the entire spring as such being subject to heating up to quite a sensible extent, under resulting the problems concerning durability and the need for appropriate heat-sink provisions to be taken.

Figure 7:
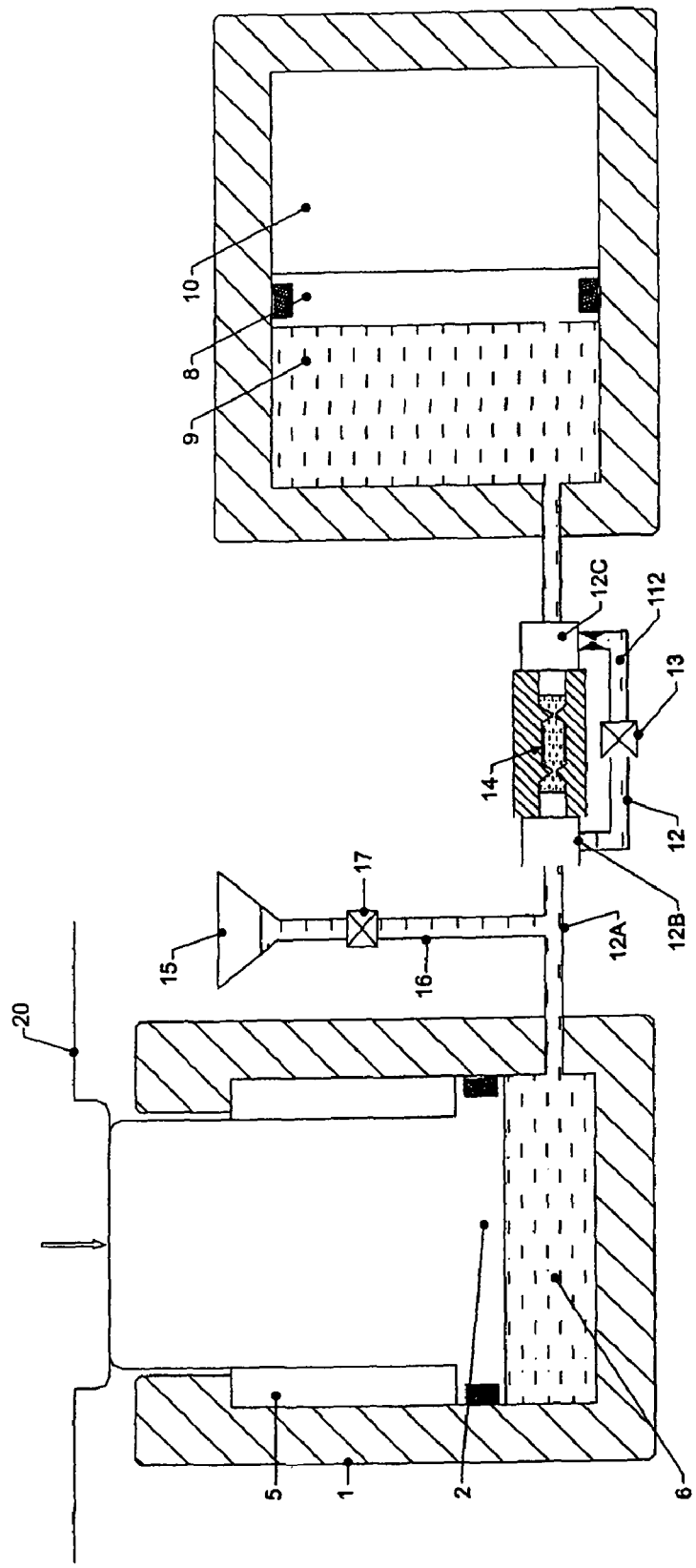
FIG. 7 is a view of an improved embodiment of the spring shown in the preceding Figures.

In view of avoiding all such limitations and complications, with reference to FIG. 7 a useful and effective improvement is easily implemented by arranging said throttle in an exclusive bypass branch, through which the hydraulic medium is capable of flowing only, or prevailingly, during the return-stroke phase, and not the spring compression one; the need therefore arises for an oil delivery conduit 12A to be provided, so as it however extends in parallel relative to said first conduit 12.

However, this delivery conduit 12A cannot be flown through by the return hydraulic medium freely, since this would constitute an unintentional bypass for the return flow of the hydraulic medium, thereby thwarting the function of both said throttle 112 and the shut-off valve 13. To this purpose, therefore, said delivery flowpath 12A is provided with an appropriate automatic check valve 14 to prevent the delivery flow of hydraulic medium from being able to pass from the chamber 9 to the chamber 6 during said return-stroke phase.

For this to be effective, therefore, said first conduit 12 must debouch with its entry ports 12B and 12C, which delimit a conduit section comprising said first valve and said throttle 112, upstream and downstream of said check valve 14, respectively.

Anyway, the advantage deriving from this improvement lies mainly in the certainty that, should said valve 13 remain in its closed state for any reason whatsoever—not necessarily ascribable to a failure or malfunction of the same valve, but also due to an error of said control means 100—during the above-cited spring compression step A (i.e. when hydraulic medium under pressure is therefore caused to pass over from the chamber 6 into the chamber 9), then the pressure of the hydraulic medium in said chamber 6 will anyway be released into said chamber 9 by passing through said check valve 14, thereby preventing all those component parts that would otherwise be affected from most likely suffering serious damages.

In this way, as this is illustrated schematically in FIG. 7, a circuit arrangement is implemented, which enables all of the desired aims to be reached and, furthermore, allows for easy installation in the most favourable positions, as well as simple and convenient maintenance and disassembly of the various component parts, with most favourable effects as far as adjustment and setting needs and interchangeability of individual devices and parts are concerned.

Figure 8:
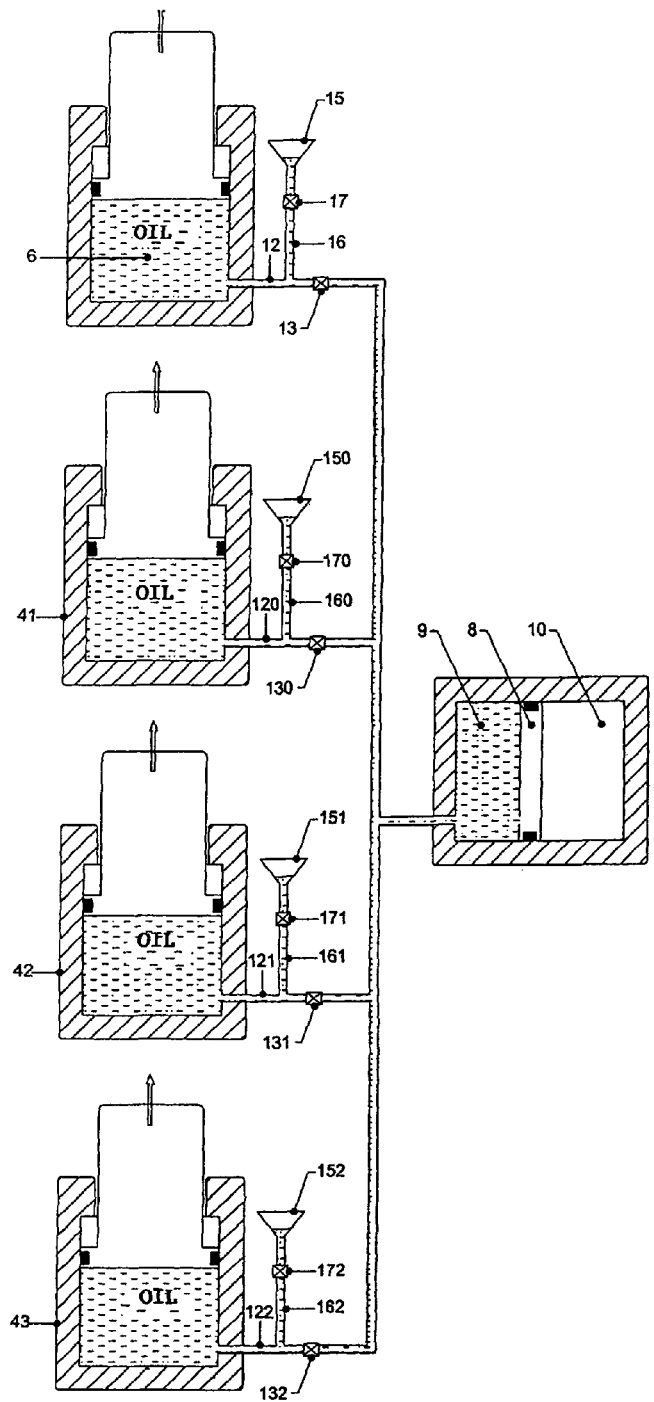
FIG. 8 is a conceptual view of an example of application of a plurality of springs according to the present invention, in which the dampening function is shared out among said plurality of springs.

The above-described spring allows for another advantageous possibility in that the application scope thereof can be extended, actually. With reference to FIG. 8, it should in fact be most appropriately noticed that a spring according to the present invention cannot be limited to just a single elastic-resistance and pressing member, and related chambers capable of being filled with hydraulic medium and gas, as described hereinbefore, but can advantageously comprise also a plurality of distinct, single springs 41, 42, 43, . . . , which may also be different form each other, but all of them connected to the same and common chamber containing hydraulic medium 9.

The respective conduits 120, 121, 122, etc. for connecting said springs to the common chamber 9 are provided with respective valves 130, 131, 132, . . . , and join each other into the first conduit 12 at a position located downstream from said respective valves 130, 131, 132, etc. and, of course, upstream to the common second chamber 9, wherein each one of said conduits 120, 121, 122, etc. is associated to a respective second conduit 160, 161, 162, etc. and a respective expansion vessel 150, 151, 152, etc., as well as respective valves 170, 171, 172, etc.

A configuration is therefore embodied, which is based on a concept that has some analogy with the one the one at the basis of the well-known so-called "common rail" configuration, since an association is in this case brought about between a plurality of distinct and different final working devices (i.e. the rods of the springs, in the case being considered) and some common pressure control and adjustment means (the chamber 9 located downstream, in the particular case being considered).

The other parts, members and details illustrated in FIG. 8 have construction and working characteristics that are fully and readily appreciable from strict analogy, so that they have not been specially identified.

Anyway, the operation of the devices that have been described and illustrated above with reference to FIG. 8 does not raise any difficulty at all, since—in normal use in their preferred fields of application—these springs 41, 42, 43 can be compressed and released under perfect synchronism, owing to all this occurring within a same metal-forming or similar cycle.

Basically, each spring member is operated concurrently and—of course—also the respective valves, 13, 130, 131, 132, etc., the conduits 16, 160, 161, 162, etc., the respective expansion vessels 15, 150, 151, 152, etc., the respective valves 17, 170, 171, 172, etc. are operated concurrently, thereby ultimately obtaining the effect of a kind of "diffuse spring", in which a plurality of distinct, synchronically operating elastic-resistance elements are associated and linked up to a single set of other common elements (i.e. the chambers 9, 10 and the related conduits and valves).

As it can be readily appreciated, the advantage of such improvement is of both an economic and functional nature: it practically derives from the possibility of doing away with a plurality of individual chambers to be filled with hydraulic medium and gas and associated to respective distinct elastic-resistance members, and having them replaced with a single chamber 9 and a single chamber 10—both of them adequately sized, of course. In addition, the provision of a plurality of individual valves 130, 131, 132, etc., individual conduits 160, 161, 162, etc., respective expansion vessels 150, 151, 152, etc., and respective valves 170, 171, 172, etc. enables even a kind of non-synchronous operation to be obtained, in which the release of the various spring elements 41, 42, 43, etc.— further to the spring whose rod is indicated at 4 in the Figure—is rather timed in a selective manner; this possibility is greatly appreciated, and may even prove necessary, in all those applications in which a very strict control of the timing—in an orderly and independent sequence—of the release instants for each single spring is required.

Figure 9:
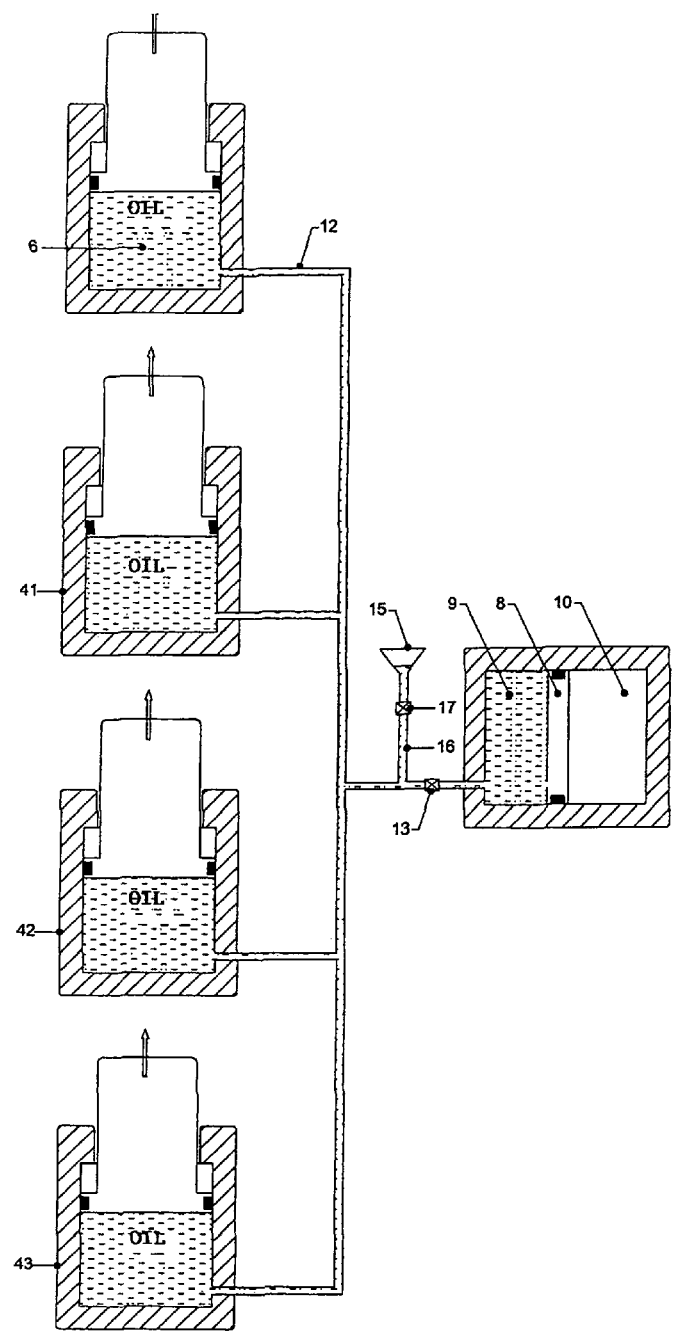
FIG. 9 is a view of an improved embodiment of an association of a plurality of springs as an alternative to the embodiment shown in FIG. 8.

If such possibility, however, is not a requirement, and a release phase is accepted in which the release of all spring elements occurs concurrently, then a further advantageous improvement of the present invention may be achieved in the way illustrated in FIG. 9, in which there is basically represented the same configuration as the one shown in FIG. 8, with the difference that, in this case, the individual valves 130, 131, 132, etc., the conduits 160, 161, 162, etc. and the respective expansion vessels 150, 151, 152, etc. are eliminated, while the function thereof is taken up by a single valve 13 and a single second conduit 16 with the related expansion vessel 15 and second valve 17. This particular embodiment, therefore, also enables not only the chambers associated to distinct spring elements, but also the valve 13 to be unified, thereby bringing about a number of advantages of both a manufacturing and functional nature and purport, also in the light of the fact that even said control means 100 can be scaled down and simplified correspondingly.

The above description has been given with reference to a combination oil/gas spring, in which there have not been specifically described any of the operating peculiarities of such spring as provided with also the afore-mentioned delayed and slowed-down working modes, wherein—as already stated hereinbefore—such terms are considered as being generally known to those skilled in the art.

It can however be most readily appreciated that the embodiment illustrated in FIG. 7 brings about also a kind of operation of the delayed type, since the controlled opening of the valve 13 allows exactly for a kind of thoroughly and perfectly delayable operation.

As far as the slowed-down operation mode is on the contrary concerned, it should be noticed that the fourth chamber 10, which is filled with gas only, can be a non-independent chamber, but rather be in turn part of a slowed-down gas spring according to the prior-art.

Figure 2:
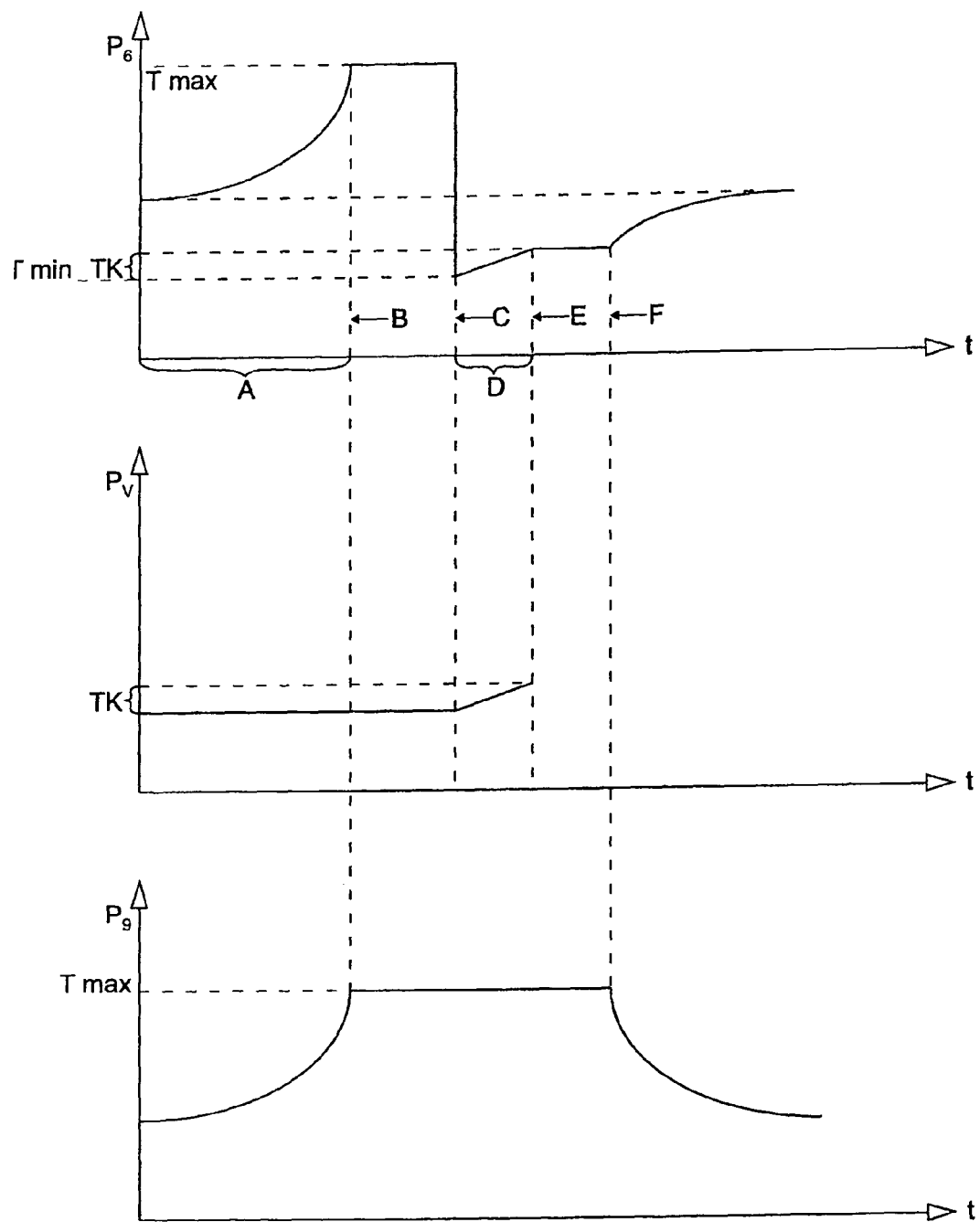
FIG. 2 is a diagrammatical view illustrating three graphs representing three respective development patterns of the pressure within three respective portions of the spring, in corresponding significant moments of the operation thereof.

As a matter of fact, such chamber 10 may be the compression chamber of a slowed-down gas spring, such as for instance—but not solely—of the type described and illustrated inside the closed-loop line B in FIGS. 2 and 3 accompanying the EP publication No. 1 500 843 and the corresponding Italian patent application No. PN2001A000038; in addition, also the Italian patent application No. PN2002A000068 teaches a combination oil/gas spring with delayed operation feature, which is obtained by simply adding a hollow casing (11), a respective conduit (14), a respective valve (15), along with an appropriate operating sequence of the control means (100), to a combination oil/gas spring known as such in the art.

The teaching in this patent application can therefore be readily used to implement a combination oil/gas spring of the slowed-down type using the present invention.

The invention claimed is:

1. A combined oil/pneumatic spring, comprising:
a first hollow casing;
a first piston adapted to slidably move in a substantially fluid-tight manner within said first hollow casing;
a rod connected rigidly with an extremity thereof to a central portion of said first piston such that a portion of said rod protrudes outside of said first hollow casing;
a first chamber provided in an interior of said first hollow casing, said first chamber being delimited by said first piston and, partially, surfaces of said rod and inner walls of said first hollow casing;
a second chamber provided in the interior of said first hollow casing, said second chamber being a sealed chamber delimited by said first piston and inner walls of said first hollow casing on an opposite side of said first piston relative to said first chamber;
a mass of hydraulic medium filling up said second chamber;
a second hollow casing;
a second piston adapted to slide within said second hollow casing and fluid-tightly fitting against walls of the second hollow casing so as to define a third chamber and a fourth chamber, said third chamber being a variable-volume chamber which is constantly filled up with a hydraulic medium, said fourth chamber being a variable-volume chamber which is constantly filled up with gas, wherein said third and fourth chambers are distinct and separated from each other by said second piston;
a first conduit connecting an interior of said second chamber with an interior of said third chamber;
first valve means associated to said first conduit and adapted to selectively open and close said first conduit;
an expansion vessel;
a second conduit connecting said expansion vessel with said first conduit at a position lying upstream of said first valve means;
second valve means provided on said second conduit, said second valve means being selectively controllable so as to allow hydraulic medium to flow through said second valve means in both directions; and
control means adapted to selectively control opening and closing of said first valve means and said second valve means.

2. The combined oil/pneumatic spring according to claim 1, further comprising:
pressing means adapted to act upon a surface of hydraulic medium in said expansion vessel at a selectively pre-definable pressure.

3. The combined oil/pneumatic spring according to claim 2, wherein said pressing means comprises:
a third piston adapted to fluid-tightly seal off said expansion vessel from a top of said expansion vessel by sliding in a fluid-tight manner within inner walls of said expansion vessel; and
actuating means adapted to act upon an upper surface of said third piston.

4. The combined oil/pneumatic spring according to claim 3, wherein said actuating means comprises at least one of a spiral spring and a gas spring.

5. The combined oil/pneumatic spring according to claim 4, further comprising:
a throttle having a pre-defined flow-rate arranged in said first conduit in series to said first valve means; and
a delivery conduit arranged in parallel to said first conduit.

6. The combined oil/pneumatic spring according to claim 4, wherein said first hollow casing comprises a plurality of first hollow casings,
wherein said first piston comprises a plurality of first pistons, said first pistons being adapted to slidably move within said first hollow casings, respectively,
wherein said rod comprises a plurality of rods, said rods being connected rigidly to central portions of said first pistons, respectively,
wherein said first chamber comprises a plurality of first chambers provided in said first hollow casings, respectively,
wherein said second chamber comprises a plurality of second chambers provided in said first hollow casings, respectively, the hydraulic medium filling up each of said second chambers,
wherein said first conduit comprises a plurality of first conduits respectively connecting said second chambers with said third chamber,
wherein said first valve means comprises a plurality of first valve means associated to said first conduits, respectively, wherein said expansion vessel comprises a plurality of expansion vessels, wherein said second conduit comprises a plurality of second conduits connecting said expansion vessels with said first conduits, respectively, wherein said second valve means comprises a plurality of second valve means provided on said second conduits, respectively, and wherein said first conduits connect into a single conduit downstream of said first valve means which connects with said third chamber.

7. The combined oil/pneumatic spring according to claim 3, wherein said actuating means comprises an actuator adapted to act in a selectively controllable manner upon said third piston.

8. The combined oil/pneumatic spring according to claim 7, further comprising:
 a throttle having a pre-defined flow-rate arranged in said first conduit in series to said first valve means; and
 a delivery conduit arranged in parallel to said first conduit.

9. The combined oil/pneumatic spring according to claim 7, wherein said first hollow casing comprises a plurality of first hollow casings,
 wherein said first piston comprises a plurality of first pistons, said first pistons being adapted to slidably move within said first hollow casings, respectively,
 wherein said rod comprises a plurality of rods, said rods being connected rigidly to central portions of said first pistons, respectively,
 wherein said first chamber comprises a plurality of first chambers provided in said first hollow casings, respectively,
 wherein said second chamber comprises a plurality of second chambers provided in said first hollow casings, respectively, the hydraulic medium filling up each of said second chambers,
 wherein said first conduit comprises a plurality of first conduits respectively connecting said second chambers with said third chamber,
 wherein said first valve means comprises a plurality of first valve means associated to said first conduits, respectively,
 wherein said expansion vessel comprises a plurality of expansion vessels,
 wherein said second conduit comprises a plurality of second conduits connecting said expansion vessels with said first conduits, respectively,
 wherein said second valve means comprises a plurality of second valve means provided on said second conduits, respectively,
 and wherein said first conduits connect into a single conduit downstream of said first valve means which connects with said third chamber.

10. The combined oil/pneumatic spring according to claim 3, further comprising:
 a throttle having a pre-defined flow-rate arranged in said first conduit in series to said first valve means; and
 a delivery conduit arranged in parallel to said first conduit.

11. The combined oil/pneumatic spring according to claim 3, wherein said first hollow casing comprises a plurality of first hollow casings,
 wherein said first piston comprises a plurality of first pistons, said first pistons being adapted to slidably move within said first hollow casings, respectively,
 wherein said rod comprises a plurality of rods, said rods being connected rigidly to central portions of said first pistons, respectively,
 wherein said first chamber comprises a plurality of first chambers provided in said first hollow casings, respectively,
 wherein said second chamber comprises a plurality of second chambers provided in said first hollow casings, respectively, the hydraulic medium filling up each of said second chambers,
 wherein said first conduit comprises a plurality of first conduits respectively connecting said second chambers with said third chamber,
 wherein said first valve means comprises a plurality of first valve means associated to said first conduits, respectively,
 wherein said expansion vessel comprises a plurality of expansion vessels,
 wherein said second conduit comprises a plurality of second conduits connecting said expansion vessels with said first conduits, respectively,
 wherein said second valve means comprises a plurality of second valve means provided on said second conduits, respectively,
 and wherein said first conduits connect into a single conduit downstream of said first valve means which connects with said third chamber.

12. The combined oil/pneumatic spring according to claim 2, wherein said pressing means comprises:
 a gas source adapted to exert, upon the surface of hydraulic medium in said expansion vessel, a pneumatic pressure that is controllable with the aid of selectively operable valve means.

13. The combined oil/pneumatic spring according to claim 12, further comprising:
 a throttle having a pre-defined flow-rate arranged in said first conduit in series to said first valve means; and
 a delivery conduit arranged in parallel to said first conduit.

14. The combined oil/pneumatic spring according to claim 12, wherein said first hollow casing comprises a plurality of first hollow casings,
 wherein said first piston comprises a plurality of first pistons, said first pistons being adapted to slidably move within said first hollow casings, respectively,
 wherein said rod comprises a plurality of rods, said rods being connected rigidly to central portions of said first pistons, respectively,
 wherein said first chamber comprises a plurality of first chambers provided in said first hollow casings, respectively,
 wherein said second chamber comprises a plurality of second chambers provided in said first hollow casings, respectively, the hydraulic medium filling up each of said second chambers,
 wherein said first conduit comprises a plurality of first conduits respectively connecting said second chambers with said third chamber,
 wherein said first valve means comprises a plurality of first valve means associated to said first conduits, respectively,
 wherein said expansion vessel comprises a plurality of expansion vessels,
 wherein said second conduit comprises a plurality of second conduits connecting said expansion vessels with said first conduits, respectively,
 wherein said second valve means comprises a plurality of second valve means provided on said second conduits, respectively, and wherein said first conduits connect into a single conduit downstream of said first valve means which connects with said third chamber.

15. The combined oil/pneumatic spring according to claim 2, further comprising:
a throttle having a pre-defined flow-rate arranged in said first conduit in series to said first valve means; and
a delivery conduit arranged in parallel to said first conduit.

16. The combined oil/pneumatic spring according to claim 2, wherein said first hollow casing comprises a plurality of first hollow casings,
wherein said first piston comprises a plurality of first pistons, said first pistons being adapted to slidably move within said first hollow casings, respectively,
wherein said rod comprises a plurality of rods, said rods being connected rigidly to central portions of said first pistons, respectively,
wherein said first chamber comprises a plurality of first chambers provided in said first hollow casings, respectively,
wherein said second chamber comprises a plurality of second chambers provided in said first hollow casings, respectively, the hydraulic medium filling up each of said second chambers,
wherein said first conduit comprises a plurality of first conduits respectively connecting said second chambers with said third chamber,
wherein said first valve means comprises a plurality of first valve means associated to said first conduits, respectively,
wherein said expansion vessel comprises a plurality of expansion vessels,
wherein said second conduit comprises a plurality of second conduits connecting said expansion vessels with said first conduits, respectively,
wherein said second valve means comprises a plurality of second valve means provided on said second conduits, respectively,
and wherein said first conduits connect into a single conduit downstream of said first valve means which connects with said third chamber.

17. The combined oil/pneumatic spring according to claim 1, further comprising:
a throttle having a pre-defined flow-rate arranged in said first conduit in series to said first valve means; and
a delivery conduit arranged in parallel to said first conduit.

18. The combined oil/pneumatic spring according to claim 17, further comprising:
a check valve provided in said delivery conduit, wherein entry ports of said delivery conduit connect to end portions of said first conduit at opposite sides of said check valve, respectively.

19. The combined oil/pneumatic spring according to claim 18, wherein said first hollow casing comprises a plurality of first hollow casings,
wherein said first piston comprises a plurality of first pistons, said first pistons being adapted to slidably move within said first hollow casings, respectively,
wherein said rod comprises a plurality of rods, said rods being connected rigidly to central portions of said first pistons, respectively,
wherein said first chamber comprises a plurality of first chambers provided in said first hollow casings, respectively, wherein said second chamber comprises a plurality of second chambers provided in said first hollow casings, respectively, the hydraulic medium filling up each of said second chambers,
wherein said first conduit comprises a plurality of first conduits respectively connecting said second chambers with said third chamber,
wherein said first valve means comprises a plurality of first valve means associated to said first conduits, respectively,
wherein said expansion vessel comprises a plurality of expansion vessels,
wherein said second conduit comprises a plurality of second conduits connecting said expansion vessels with said first conduits, respectively,
wherein said second valve means comprises a plurality of second valve means provided on said second conduits, respectively,
and wherein said first conduits connect into a single conduit downstream of said first valve means which connects with said third chamber.

20. The combined oil/pneumatic spring according to claim 17, wherein said first hollow casing comprises a plurality of first hollow casings,
wherein said first piston comprises a plurality of first pistons, said first pistons being adapted to slidably move within said first hollow casings, respectively,
wherein said rod comprises a plurality of rods, said rods being connected rigidly to central portions of said first pistons, respectively,
wherein said first chamber comprises a plurality of first chambers provided in said first hollow casings, respectively,
wherein said second chamber comprises a plurality of second chambers provided in said first hollow casings, respectively, the hydraulic medium filling up each of said second chambers,
wherein said first conduit comprises a plurality of first conduits respectively connecting said second chambers with said third chamber,
wherein said first valve means comprises a plurality of first valve means associated to said first conduits, respectively,
wherein said expansion vessel comprises a plurality of expansion vessels,
wherein said second conduit comprises a plurality of second conduits connecting said expansion vessels with said first conduits, respectively,
wherein said second valve means comprises a plurality of second valve means provided on said second conduits, respectively,
and wherein said first conduits connect into a single conduit downstream of said first valve means which connects with said third chamber.

21. The combined oil/pneumatic spring according to claim 1, wherein said first hollow casing comprises a plurality of first hollow casings,
wherein said first piston comprises a plurality of first pistons, said first pistons being adapted to slidably move within said first hollow casings, respectively,
wherein said rod comprises a plurality of rods, said rods being connected rigidly to central portions of said first pistons, respectively,
wherein said first chamber comprises a plurality of first chambers provided in said first hollow casings, respectively, wherein said second chamber comprises a plurality of second chambers provided in said first hollow casings, respectively, the hydraulic medium filling up each of said second chambers, wherein said first conduit comprises a plurality of first conduits respectively connecting said second chambers with said third chamber, wherein said first valve means comprises a plurality of first valve means associated to said first conduits, respectively, wherein said expansion vessel comprises a plurality of expansion vessels, wherein said second conduit comprises a plurality of second conduits connecting said expansion vessels with said first conduits, respectively, wherein said second valve means comprises a plurality of second valve means provided on said second conduits, respectively, and wherein said first conduits connect into a single conduit downstream of said first valve means which connects with said third chamber.

22. The combined oil/pneumatic spring according to claim 1, wherein said first hollow casing comprises a plurality of first hollow casings, wherein said first piston comprises a plurality of first pistons, said first pistons being adapted to slidably move within said first hollow casings, respectively, wherein said rod comprises a plurality of rods, said rods being connected rigidly to central portions of said first pistons, respectively, wherein said first chamber comprises a plurality of first chambers provided in said first hollow casings, respectively, wherein said second chamber comprises a plurality of second chambers provided in said first hollow casings, respectively, the hydraulic medium filling up each of said second chambers, wherein said first conduit includes a plurality of first conduit passages respectively extending from said second chambers, wherein said first conduit passages merge into said first conduit at a position upstream of the position at which said second conduit connects with said first conduit, and wherein said first conduit debouches into said third chamber at a position downstream from said first valve means.

23. The combined oil/pneumatic spring according to claim 1, wherein the second valve is selectively controllable so as to allow hydraulic medium to flow through the second valve in a first direction from the first conduit into the expansion vessel, and in a second direction from the expansion vessel into the first conduit.

* * * * *